US012679291B2

(12) United States Patent
Shida et al.

(10) Patent No.: US 12,679,291 B2
(45) Date of Patent: Jul. 14, 2026

(54) WIRE HARNESS ROUTING DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); Adient US LLC, Plymouth, MI (US)

(72) Inventors: Tomoka Shida, Osaka (JP); Satoshi Yamamoto, Osaka (JP); Kazuyoshi Ohara, Osaka (JP); Minho Yang, Kanagawa (JP); Yasuhiro Nagai, Kanagawa (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); ADIENT US LLC, Plymouth, MI (US)

( * ) Notice: Subject to any disclaimer, the term of this patent is extended or adjusted under 35 U.S.C. 154(b) by 267 days.

(21) Appl. No.: 18/712,283

(22) PCT Filed: Nov. 11, 2022

(86) PCT No.: PCT/JP2022/042061
§ 371 (c)(1),
(2) Date: May 22, 2024

(87) PCT Pub. No.: WO2023/100619
PCT Pub. Date: Jun. 8, 2023

(65) Prior Publication Data
US 2025/0065827 A1     Feb. 27, 2025

(30) Foreign Application Priority Data

Dec. 2, 2021     (JP) ................................. 2021-196159

(51) Int. Cl.
B60R 16/02          (2006.01)
B60N 2/06           (2006.01)
(Continued)

(52) U.S. Cl.
CPC ............ B60R 16/0215 (2013.01); B60N 2/06 (2013.01); B60N 2/0725 (2013.01); B60R 16/027 (2013.01)

(58) Field of Classification Search
CPC ... B60R 16/2015; B60R 16/02; B60R 16/027; H02G 3/04; B60N 2/06; B60N 2/0725; B60N 2/09
See application file for complete search history.

(56) References Cited

U.S. PATENT DOCUMENTS

2005/0035622 A1     2/2005   Tsubaki et al.
2011/0290522 A1*   12/2011   Sekino ................ B60R 16/0215
174/68.3

(Continued)

FOREIGN PATENT DOCUMENTS

JP        2005-059745 A     3/2005
JP        2015-053750 A     3/2015

(Continued)

OTHER PUBLICATIONS

International Search Report issued in International Application No. PCT/JP2022/042061, dated Jan. 24, 2023, along with an English translation thereof.

*Primary Examiner* — Timothy J Thompson
(74) *Attorney, Agent, or Firm* — Greenblum & Bernstein, P.L.C.

(57)          ABSTRACT

A wire harness routing device is for routing a wire harness under a sliding seat. The wire harness routing device includes an extra length storing case and a protector. The extra length storing case is disposed on a floor that is (Continued)

opposite a lower surface of the sliding seat. The protector is movable with respect to the extra length storing case. The wire harness includes an inner extra length portion and an outer extra length portion. The inner extra length portion is disposed in the extra length storing case and extends toward the protector and the outer extra length portion extends outside the extra length storing case from the protector toward the lower surface of the sliding seat. The sliding seat includes a pair of contact members that come into contact with the protector according to movement of the sliding seat and move the protector.

5 Claims, 20 Drawing Sheets

(51) Int. Cl.
    B60N 2/07          (2006.01)
    B60R 16/027        (2006.01)

(56)                    References Cited

U.S. PATENT DOCUMENTS

2012/0024561 A1*    2/2012   Sekino ................... H02G 11/00
                                                              174/50
2016/0280157 A1     9/2016   Katou et al.
2018/0361960 A1*   12/2018   Yamamoto ......... B60R 16/0215
2022/0181858 A1*    6/2022   Yamamoto ............... H02G 3/04
2022/0219628 A1*    7/2022   Kato .................... H02G 11/006

FOREIGN PATENT DOCUMENTS

JP          2016-174476  A      9/2016
JP          2017-034857  A      2/2017

* cited by examiner

WIRE HARNESS ROUTING DEVICE

TECHNICAL FIELD

The present disclosure relates to a wire harness routing device.

BACKGROUND ART

An example of a wire harness routing device for routing a wire harness for a sliding seat is disclosed in Japanese Unexamined Patent Application Publication No. 2016-174476 (Patent Document 1 described below). The wire harness routing device includes an extra length storing case in which an extra length portion of the wire harness can be stored. The extra length storing case includes a harness rail portion and a slider that is movable along the harness rail portion in a front-rear direction. The wire harness that extends out from the extra length storing case via the slider is covered by a caterpillar-type protector.

The extra length portion of the wire harness is stored in a space as follows. First, the wire harness that is linked to the sliding seat is covered by the caterpillar-type protector and the extra length portion of the wire harness is stored in a space by bending the caterpillar-type protector. If the entire extra length portion cannot be stored in a space only by bending the caterpillar-type protector, the rest of the extra length portion can be stored in a space by changing a length of a bent portion of the wire harness that extends out from the caterpillar-type protector and is bent in a turning portion of the extra length storing case. Accordingly, the extra length storing case can be reduced in size.

PRIOR ART

Patent Document

Patent Document 1: Japanese Unexamined Patent Application Publication No. 2016-174476

SUMMARY OF THE INVENTION

Problem to be Solved by the Invention

The caterpillar-type protector first extends frontward and is bent upward and thereafter, connected to a lower surface of the sliding seat. Therefore, the bent portion is necessarily increased in size in the upper-bottom direction. Such a configuration can be used in a configuration in which a sufficient space is provided under the sliding seat. Otherwise, such a configuration cannot be used. If the caterpillar-type protector is not included, the wire harness is moved with being bent as the sliding seat moves. Therefore, stress is applied to the bent portion of the wire harness.

Means for Solving the Problem

A wire harness routing device described herein is for routing a wire harness under a sliding seat. The wire harness routing device includes an extra length storing case disposed on a floor that is opposite a lower surface of the sliding seat, and a protector that is movable with respect to the extra length storing case. The wire harness includes an inner extra length portion and an outer extra length portion. The inner extra length portion is disposed in the extra length storing case and extends toward the protector and the outer extra length portion extends outside the extra length storing case from the protector toward the lower surface of the sliding seat. The sliding seat includes a pair of contact members that come into contact with the protector according to movement of the sliding seat and move the protector.

Effects of Invention

According to the present disclosure, tension stress is less likely to be applied to a wire harness.

Figure 1:
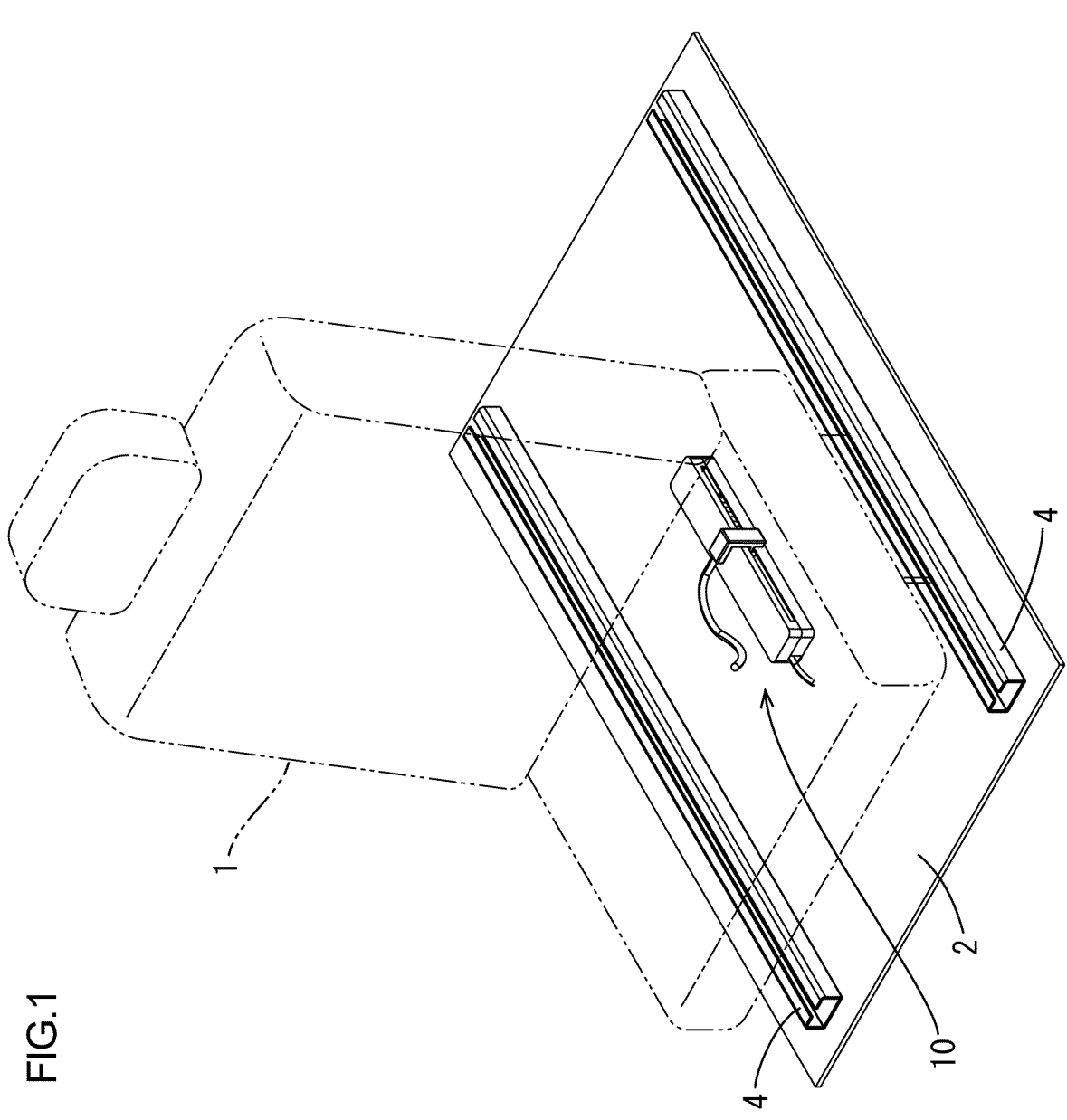
FIG. 1 is a perspective view of a wire harness routing device according to a first embodiment seen from a diagonally front side.

MODES FOR CARRYING OUT THE
INVENTION

[Description of Embodiments According to the Present Disclosure]

First, embodiments according to the present disclosure will be listed and described.

A wire harness routing device according to the present disclosure is (1) a wire harness routing device for routing a wire harness under a sliding seat. The wire harness routing device includes an extra length storing case disposed on a floor that is opposite a lower surface of the sliding seat, and a protector that is movable with respect to the extra length storing case. The wire harness includes an inner extra length portion and an outer extra length portion. The inner extra length portion is disposed in the extra length storing case and extends toward the protector and the outer extra length portion extends outside the extra length storing case from the protector toward the lower surface of the sliding seat. The sliding seat includes a pair of contact members that come into contact with the protector according to movement of the sliding seat and move the protector.

When the sliding seat is moved, the outer extra length portion, which is linked to the sliding seat, moves to absorb the extra length of the wire harness. If the extra length cannot be absorbed only by the movement of the outer extra length portion, the protector moves such that the inner extra length portion, which is arranged in the extra length storing case, is moved and the extra length of the wire harness is absorbed. The extra length storing case can be reduced in size by absorbing the extra length inside and outside the extra length storing case. Furthermore, since the protector is moved by the contact of the contact member of the sliding seat and the protector, the wire harness is less likely to receive tension stress. Therefore, even with no sufficient space being provided under the sliding seat, the extra length storing case can be disposed on the floor. This improves appearance.

(2) The protector and each of the contact members may have a pair of opposing surfaces that are opposite each other and one of the pair of opposing surfaces may include a curved surface portion that can be contacted with another one of the pair of opposing surfaces with point contact or linear contact.

When the opposing surface of the contact member is contacted with the opposing surface of the protector, the curved surface portion, which is on one of the pair of opposing surfaces, is contacted with another one of the pair of opposing surfaces with point contact or linear contact. Therefore, the contact position of the protector and the contact member is always same.

(3) The extra length storing case may include a peripheral wall that extends from the floor toward the sliding seat and the peripheral wall may include a sliding structure in which the protector is slidably mounted.

With the sliding structure being included within a height range of the peripheral wall, the extra length storing case is less likely to be increased in size due to the sliding structure.

(4) The wire harness may further include an intermediate connection portion that connects the inner extra length portion and the outer extra length portion and is disposed in the protector and the intermediate connection portion may include a peripheral wall through portion that extends through the peripheral wall.

The wire harness includes the inner extra length portion, the intermediate connection portion, and the outer extra length portion. In other words, the wire harness extends through the peripheral wall, with the peripheral wall through portion of the intermediate connection portion being through the peripheral wall, to the outside of the extra length storing case from a lateral side thereof. Then, the wire harness is routed toward the lower surface of the sliding seat. Therefore, even with no sufficient space being provided between the extra length storing case and the lower surface of the sliding seat, the wire harness can be routed in a small space. If the wire harness extends upward and out of the extra length storing case toward the lower surface of the sliding seat, the wire harness may be stepped on with shoes from above and may be broken. With the above configuration, such breakage is less likely to be caused.

[Details of Embodiment According to the Present Disclosure]

A wire harness routing device 10 according to the present disclosure will be described with reference to the drawings. The present disclosure is not limited to the embodiments described herein. All modifications within and equivalent to the technical scope of the claimed invention may be included in the technology described herein.

[Configuration of Wire Harness Routing Device]

One embodiment of the present disclosure will be described with reference to FIGS. 1 to 20. A wire harness routing device 10 of the present disclosure includes an extra length storing case 20 and a protector 30. The extra length storing case 20 is disposed on a floor 2 that faces a lower surface 5 of a sliding seat 1 mounted in an automobile. The protector 30 is movable with respect to the extra length storing case 20. A wire harness 60 is routed in a space between the sliding seat 1 and the floor 2. Power is supplied to electric components (not illustrated), which are mounted in the sliding seat 1, via the wire harness 60. The wire harness 60 including an extra length portion is routed with the wire harness routing device 10. With the extra length portion, the wire harness 60 is protected so as not to be tensioned with a great force or bent at a steep angle.

Figure 2:
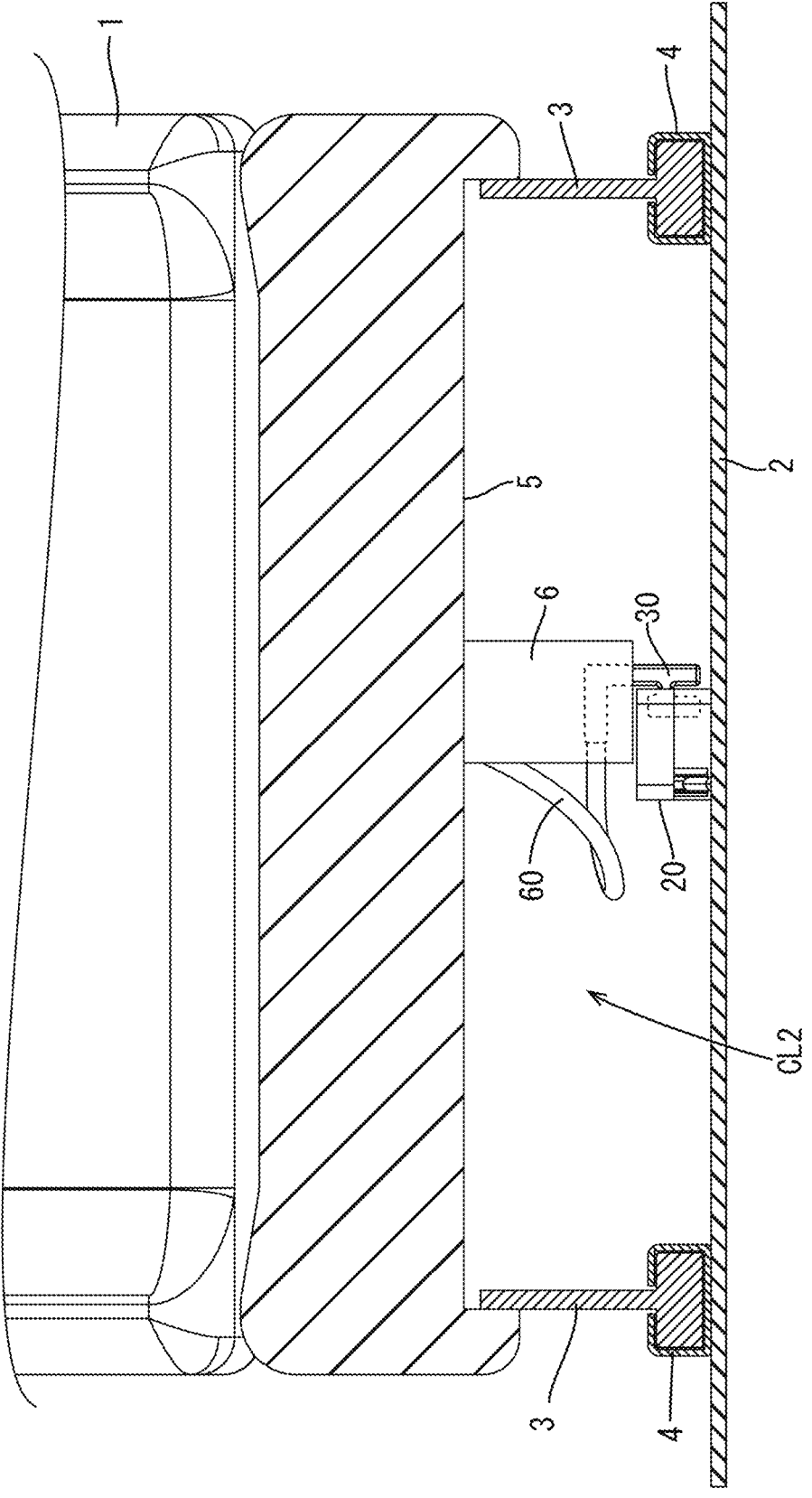
FIG. 2 is a front view of a sliding structure of a sliding seat seen from a front side.

As illustrated in FIG. 2, a pair of right and left seat legs 3 are under the sliding seat 1. A pair of right and left seat rails 4 are disposed on the floor 2. The seat rails 4 extend in the front-rear direction. The seat legs 3 are slidable on the seat rails 4. Accordingly, the sliding seat 1 is movable in the front-rear direction between a front end position (a position of the sliding seat 1 illustrated in FIG. 14) and a rear end position (a position of the sliding seat 1 illustrated in FIG. 11).

[Configuration of Extra Length Storing Case]

Figure 4:
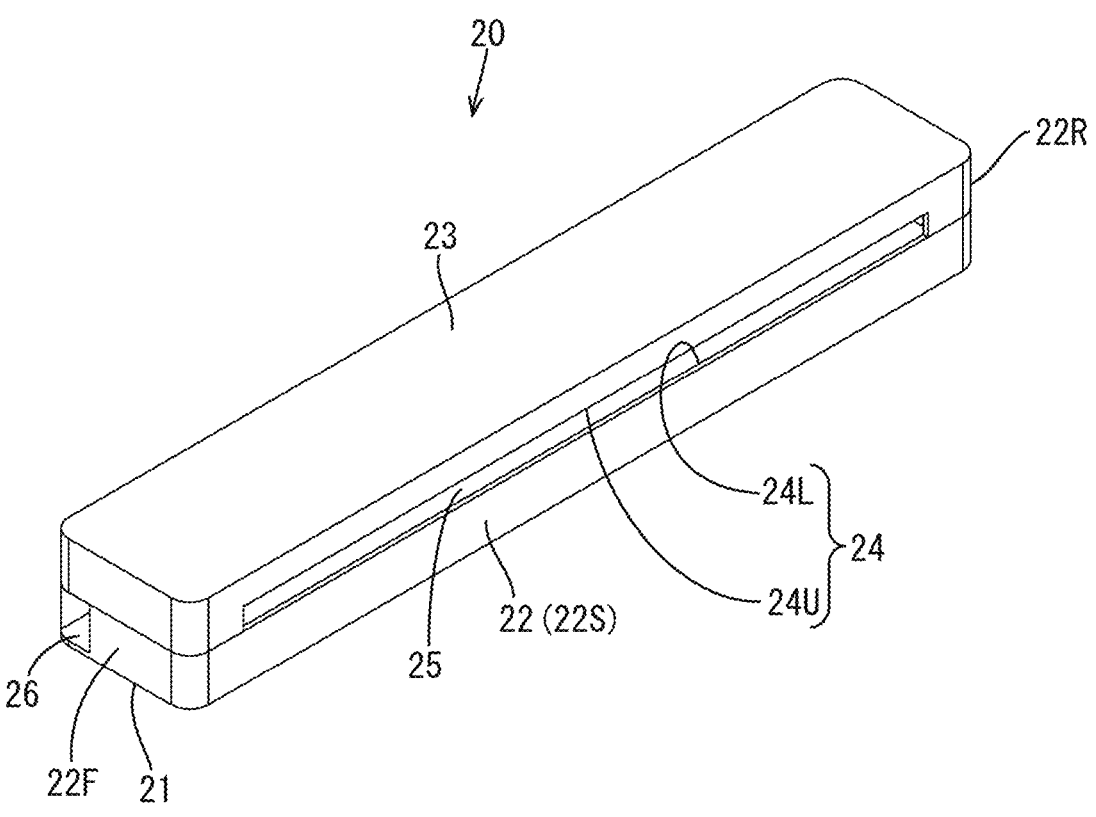
FIG. 4 is a perspective view of an extra length storing case.

As illustrated in FIG. 2, the extra length storing case 20 includes a pair of upper case and lower case. The extra length storing case 20 has a shape of a hollow rectangular parallelopiped elongated in the front-rear direction as illustrated in FIG. 4. The extra length storing case 20 is made of synthetic resin and includes a bottom wall 21, a peripheral wall 22, and a top wall 23. The extra length storing case 20 is fixed with the bottom wall 21 being contacted with the floor 2. The peripheral wall 22 extends from the floor 2 side toward the sliding seat 1. The top wall 23 is disposed to be opposite the lower surface 5 of the sliding seat 1 such that a space for routing the wire harness 60 is provided between the top wall 23 and the lower surface 5 of the sliding seat 1.

The peripheral wall 22 includes side walls 22S that extend in the front-rear direction. A slide rail 24 is included in one of the side walls 22S. The slide rail 24 includes a pair of upper and lower rails 24U, 24L. A slit 25 extending in the front-rear direction is between the rail 24U and the rail 24L. The protector 30, which will be described later, is fitted to the slit 25. The peripheral wall 22 includes a front wall 22F that is at a front end. The front wall 22F includes an inlet hole 26 through which the wire harness 60 extends into the extra length storing case 20.

[Configuration of Protector]

The protector 30 is made of synthetic resin. As illustrated in FIG. 2, the protector 30 includes an inner protector 31, an outer protector 32, and a connection portion 33. The inner protector 31 is disposed in the extra length storing case 20. The outer protector 32 is disposed outside the extra length storing case 20. The connection portion 33 connects the inner protector 31 and the outer protector 32. The protector 30 is hollow and the wire harness 60 is routed inside the protector 30.

Figure 3:
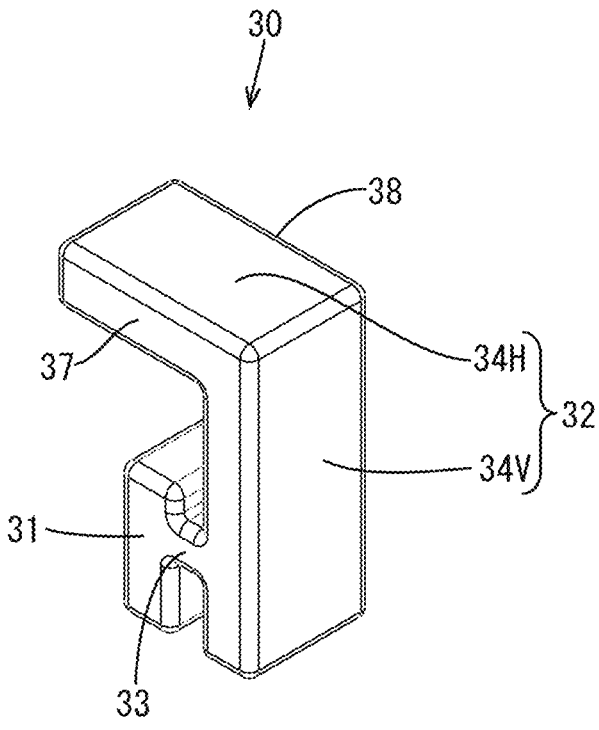
FIG. 3 is a perspective view of a protector.

As illustrated in FIGS. 2 and 3, the inner protector 31 has an I-shape in a front view and is elongated in the upper-bottom direction. The inner protector 31 is disposed along an inner surface of the slide rail 24 of the extra length storing case 20. The outer protector 32 includes a vertical portion 34V and a horizontal portion 34H. The vertical portion 34V is disposed along an outer surface of the slide rail 24 of the extra length storing case 20. The horizontal portion 34H is disposed along an upper surface of the top wall 23.

The rail 24L is a portion that is lower than the slit 25. The rail 24L is between a lower portion of the inner protector 31 that is lower than the connection portion 33 and a lower portion of the vertical portion 34V that is lower than the connection portion 33. The rail 24U is a portion that is upper than the slit 25. The rail 24U is between an upper portion of the inner protector 31 that is upper than the connection portion 33 and an upper portion of the vertical portion 34V that is upper than the connection portion 33. Furthermore, the connection portion 33 is slidable with respect to the pair of the upper rail 24U and the lower rail 24L. The connection portion 33 is supported by the lower rail 24L when the protector 30 stops. Accordingly, the protector 30 is slidable along the slide rail 24 in the front-rear direction between a front end position (the position of the protector 30 illustrated in FIG. 9) and a rear end position (the position of the protector 30 illustrated in FIG. 11).

Figure 5:
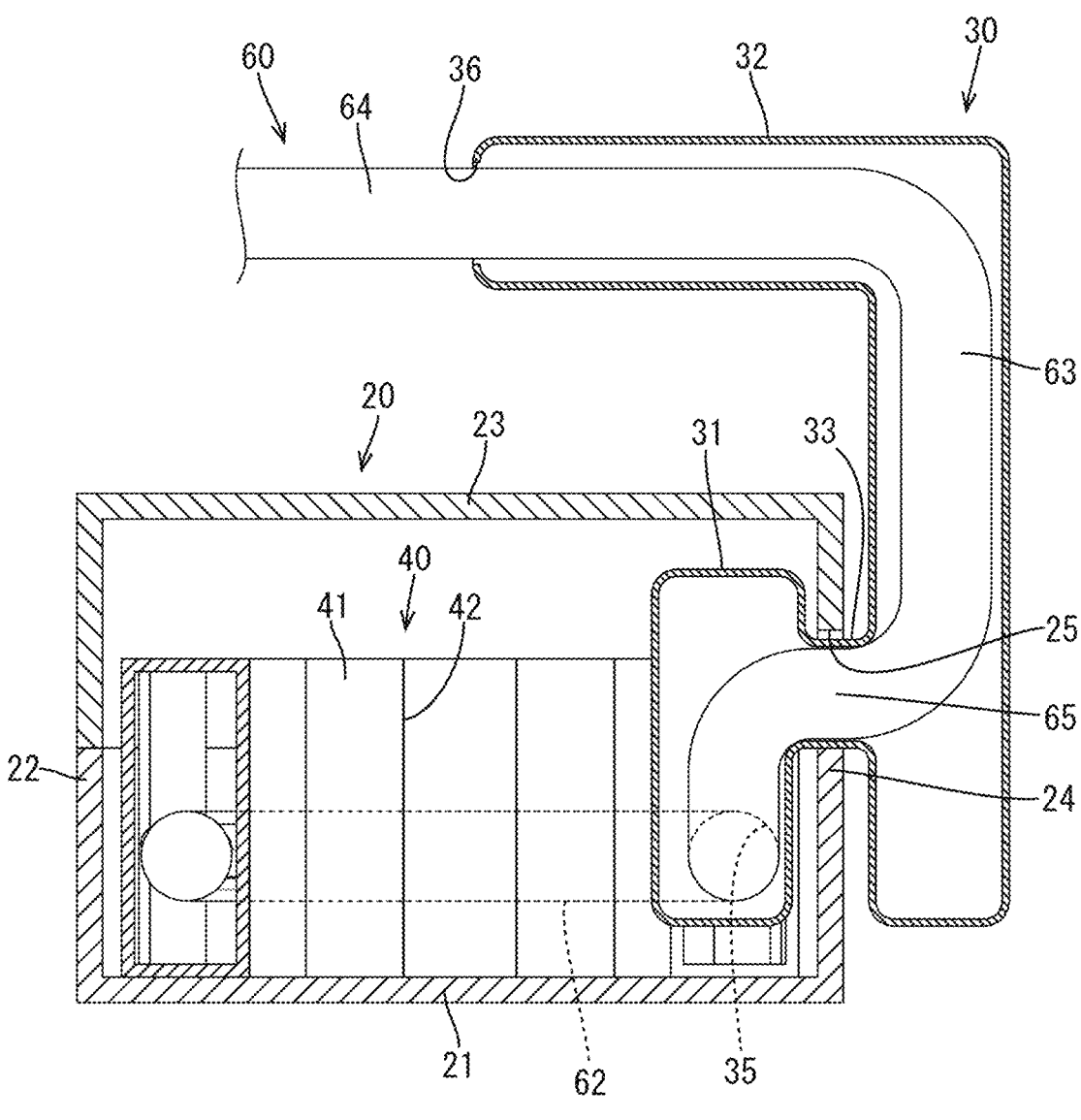
FIG. 5 is a front view of the wire harness that is routed in the extra length storing case seen from a front side.

As illustrated in FIG. 5, the wire harness 60 is routed inside the protector 30. The inner protector 31 includes an inlet hole 35 in a rear end portion of a lower portion of the inner protector 31. The wire harness 60 that is in the extra length storing case 20 enters the protector 30 through the inlet hole 35. The outer protector 32 includes an outlet hole 36 in a free end portion of the horizontal portion 34H. The wire harness 60 that is in the protector 30 exits to the outside through the outlet hole 36.

[Configuration of Caterpillar-Type Cover Member]

Figure 6:
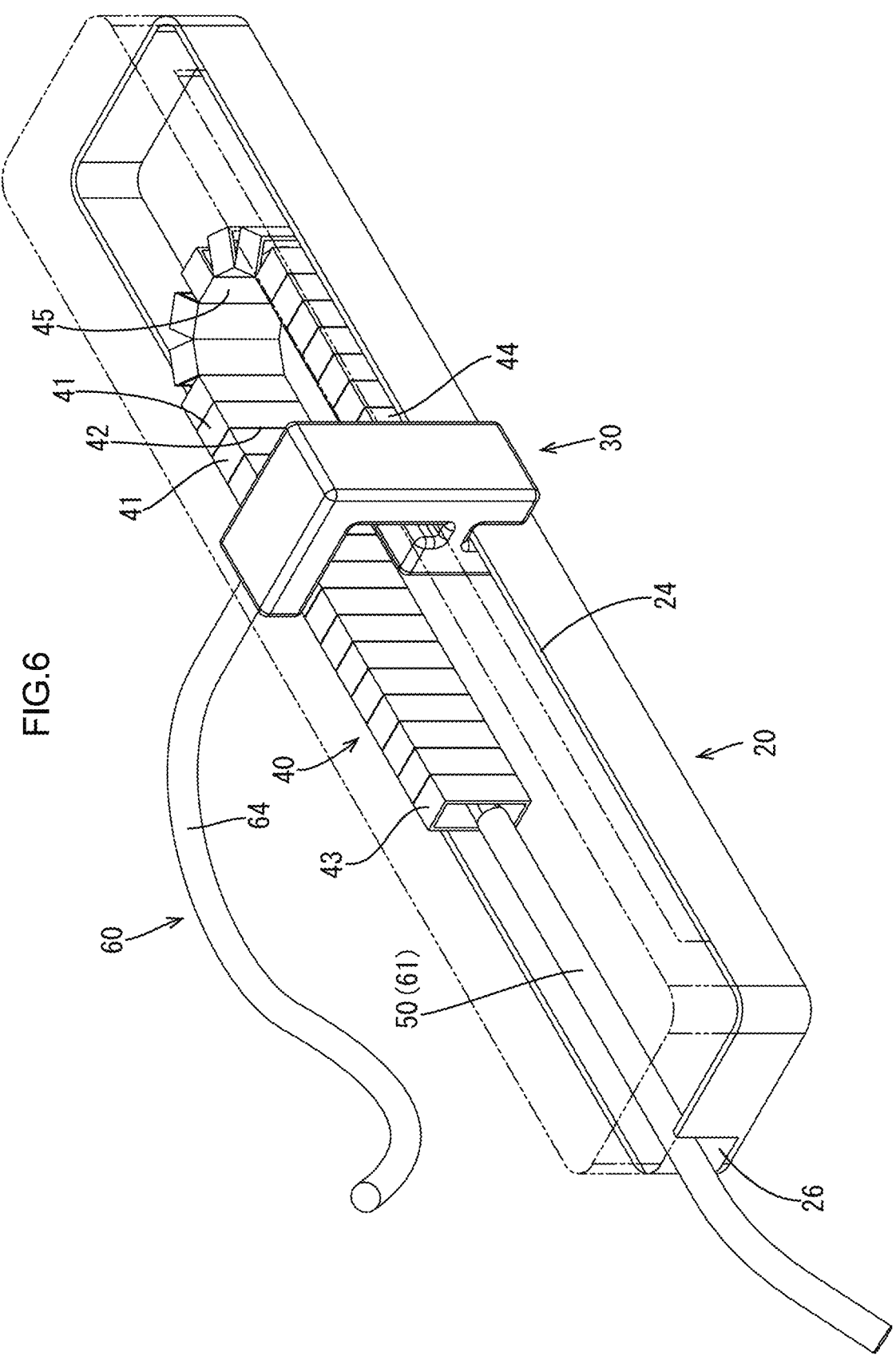
FIG. 6 is a perspective view of the wire harness that is routed in the extra length storing case seen from a diagonally front side.
Figure 7:
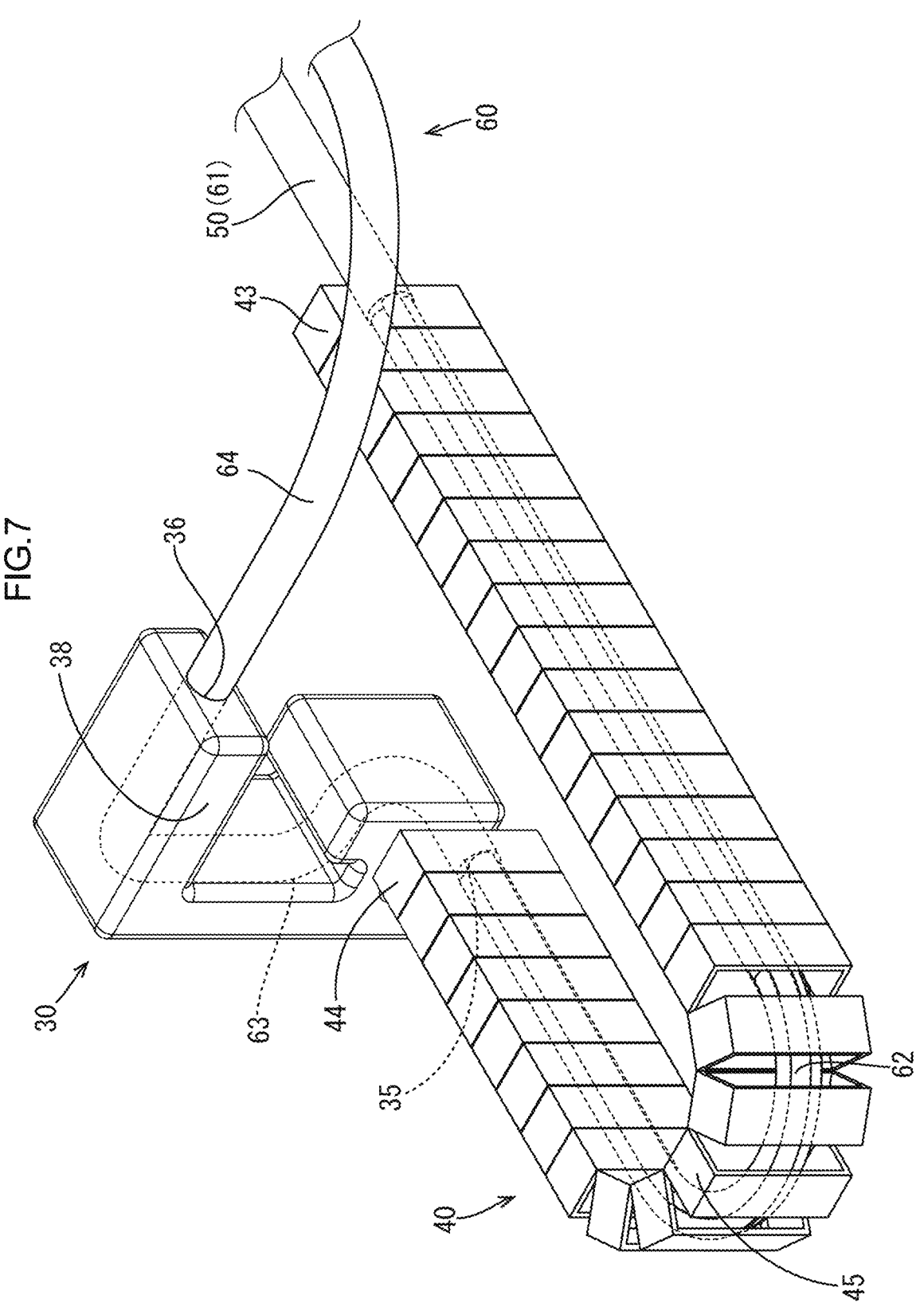
FIG. 7 is a perspective view of a caterpillar-type cover member and the wire harness that is routed in the protector seen from a diagonally rear side.
Figure 8:
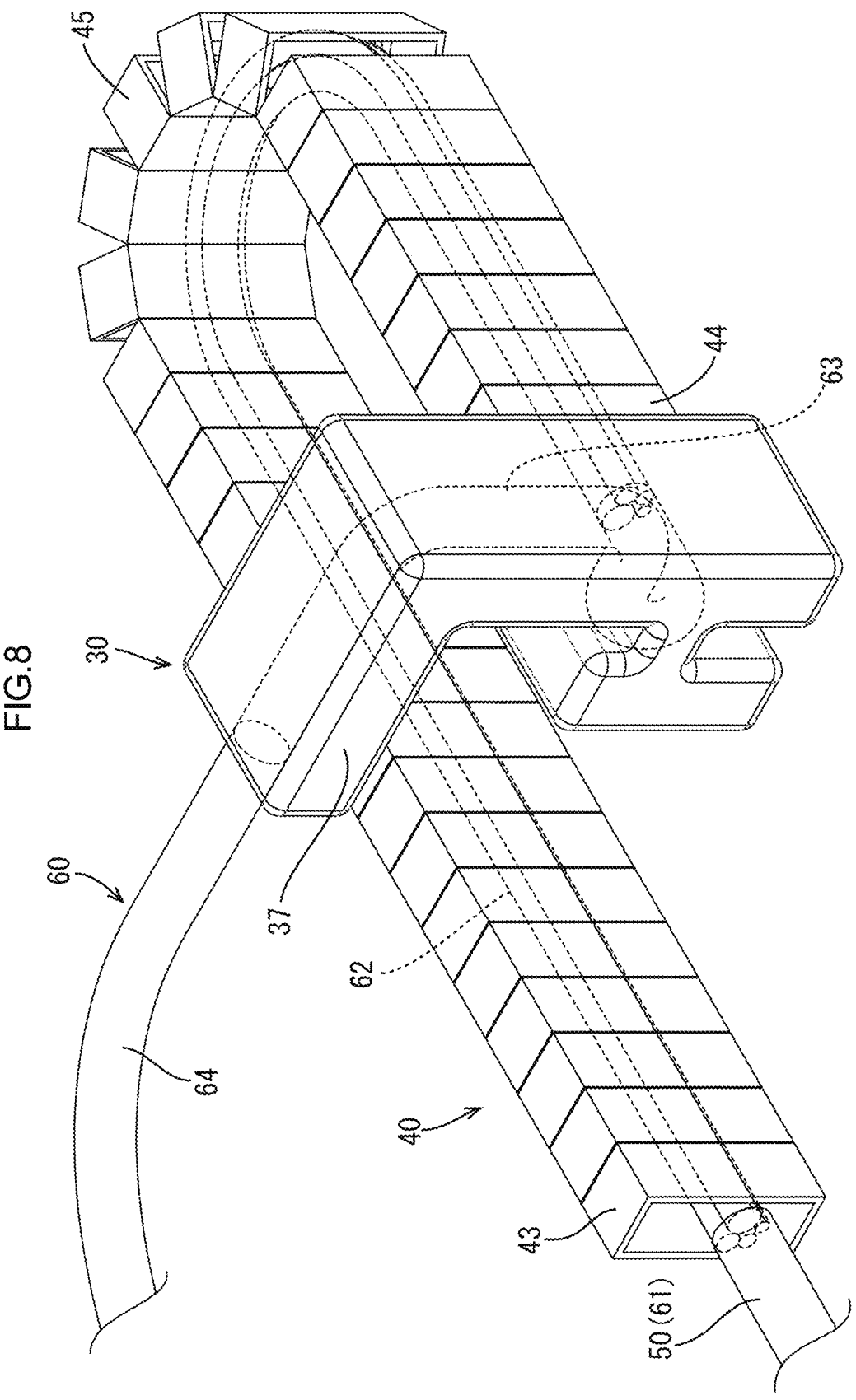
FIG. 8 is a perspective view of the caterpillar-type cover member and the wire harness that is routed in the protector seen from a front side.

As illustrated in FIG. 6, a caterpillar-type cover member 40 is arranged in the extra length storing case 20. The caterpillar-type cover member 40 is made of synthetic resin. The caterpillar type cover member 40 includes blocks 41 having a rectangular tubular shape and hinge portions 42 each of which connects adjacent two blocks 41. The wire harness 60 is inserted through the blocks 41. The caterpillar-type cover member 40 can be bent only in one direction and cannot be bent in other directions. The caterpillar-type cover member 40 is disposed such that one end 43 of the caterpillar-type cover member 40 is opposite the inlet hole 26 of the extra length storing case 20. Other end 44 of the caterpillar-type cover member 40 is connected to a rear end of the lower portion of the inner protector 31 of the protector 30. The caterpillar-type cover member 40 includes a bent portion 45 between the one end 43 and the other end 44. The caterpillar-type cover member 40 is folded at 180 degrees at the bent portion 45 and the bent portion 45 has an arched shape.

[Configuration of Corrugated Tube]

The wire harness 60 extends toward the inlet hole 26 of the extra length storing case 20 on the one end 43 side of the caterpillar-type cover member 40. The portion of the wire harness 60 extending from the one end 43 is covered and protected by a corrugated tube 50 and extends outside the extra length storing case 20. The corrugated tube 50 is made of synthetic resin and has a tubular shape with bellows. The wire harness 60 enters the protector 30 through the inlet hole 35 on the other end 44 side of the caterpillar-type cover member 40. The portion of the wire harness 60 that is inside the caterpillar-type cover member 40 is not covered by the corrugated tube 50 such that the wire harness 60 can move easily according to the movement of the bent portion 45 of the caterpillar-type cover member 40.

[Configuration of Wire Harness]

The wire harness 60 includes a first wire portion 61, a second wire portion 62, a third wire portion 63, and a fourth wire portion 64. The first wire portion 61 is in the corrugated tube 50. The second wire portion 62 is in the caterpillar-type cover member 40. The third wire portion 63 is in the protector 30. The fourth wire portion 64 extends outside the extra length storing case 20 from the protector 30. The third wire portion 63 includes a peripheral wall through portion 65 that is disposed in the connection portion 33 of the protector 30. The second wire portion 62 corresponds to an inner extra length portion in claims, the third wire portion 63 corresponds to an intermediate connection portion in claims, and the fourth wire portion 64 corresponds to an outer extra length portion in claims.

Figure 15:
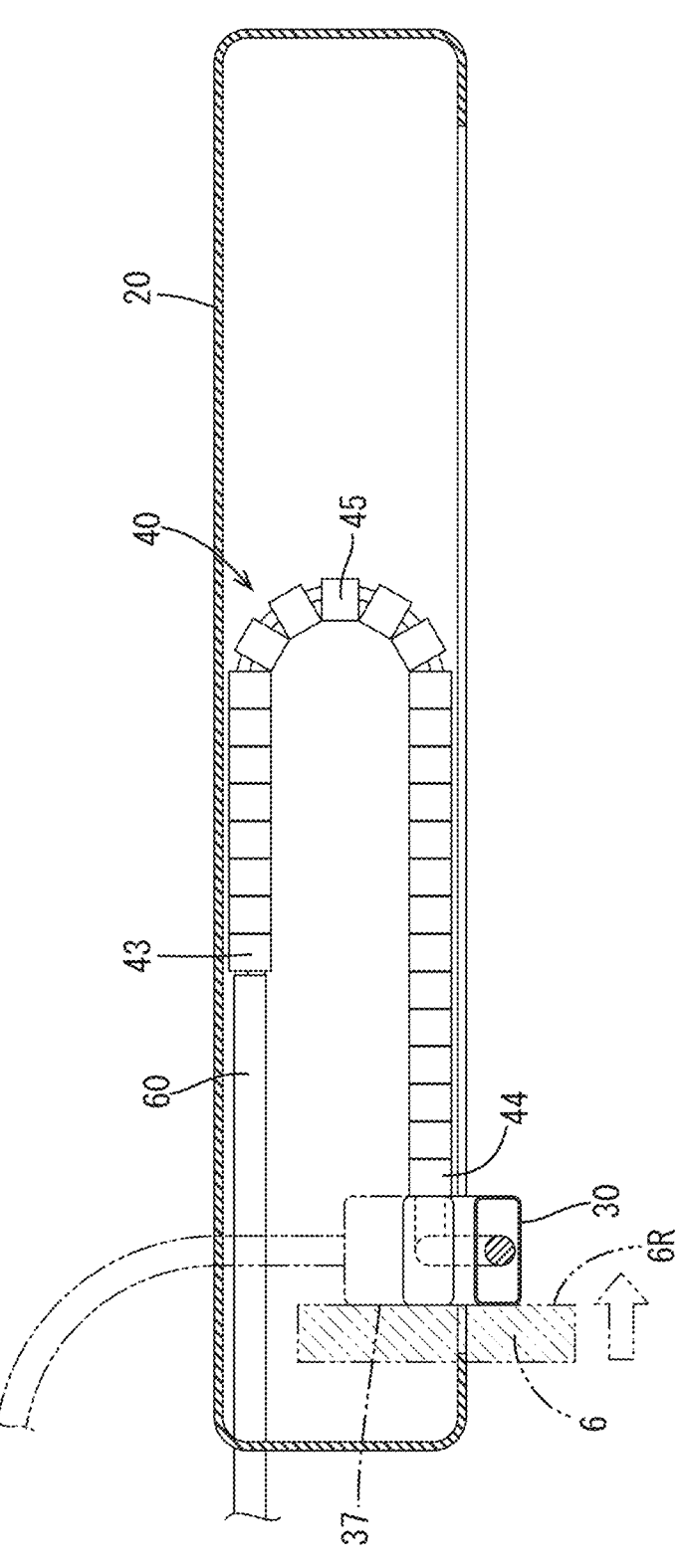
FIG. 15 is a plan view illustrating the protector that is at the front end position and starts to be moved rearward by the front contact member.
Figure 16:
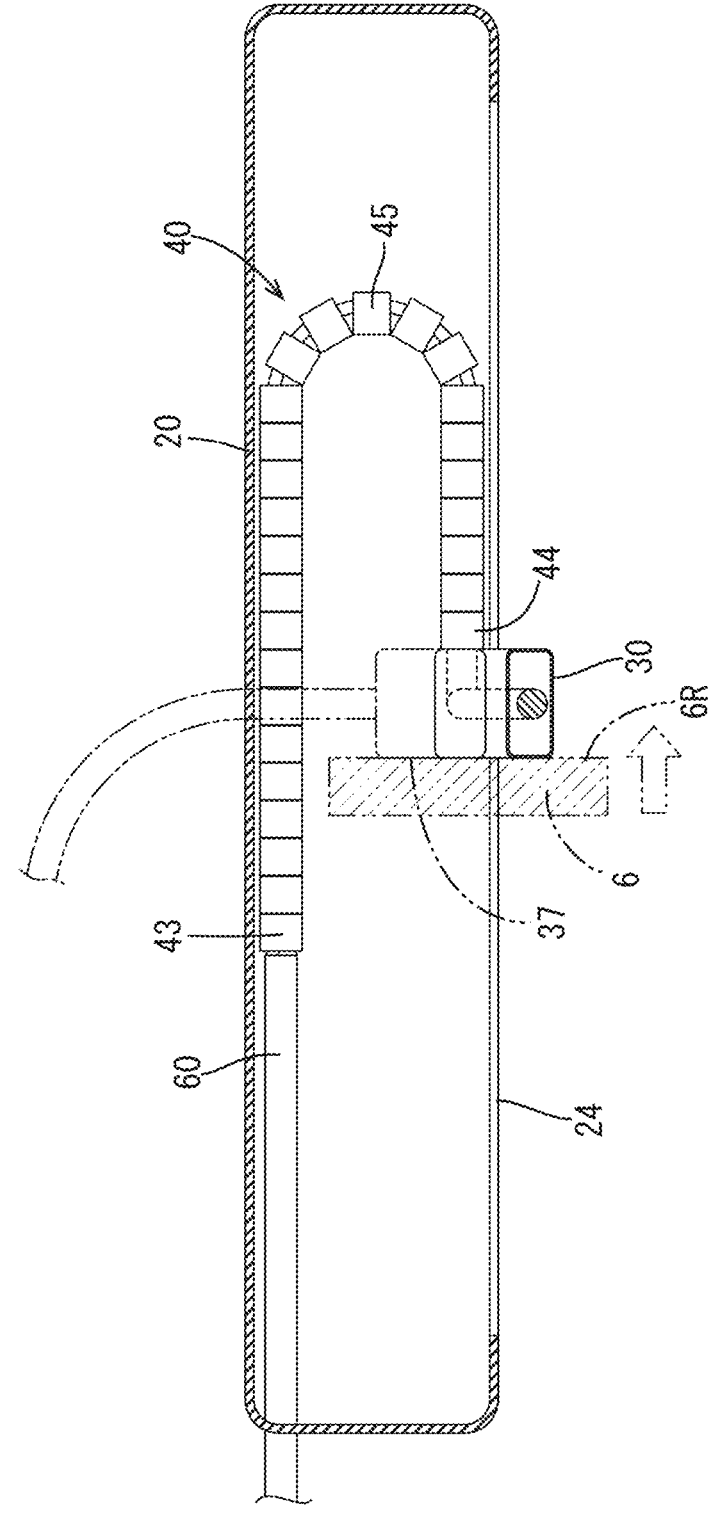
FIG. 16 is a plan view illustrating the protector that is moved by the front contact member from the front end position to the rear end position.
Figure 17:
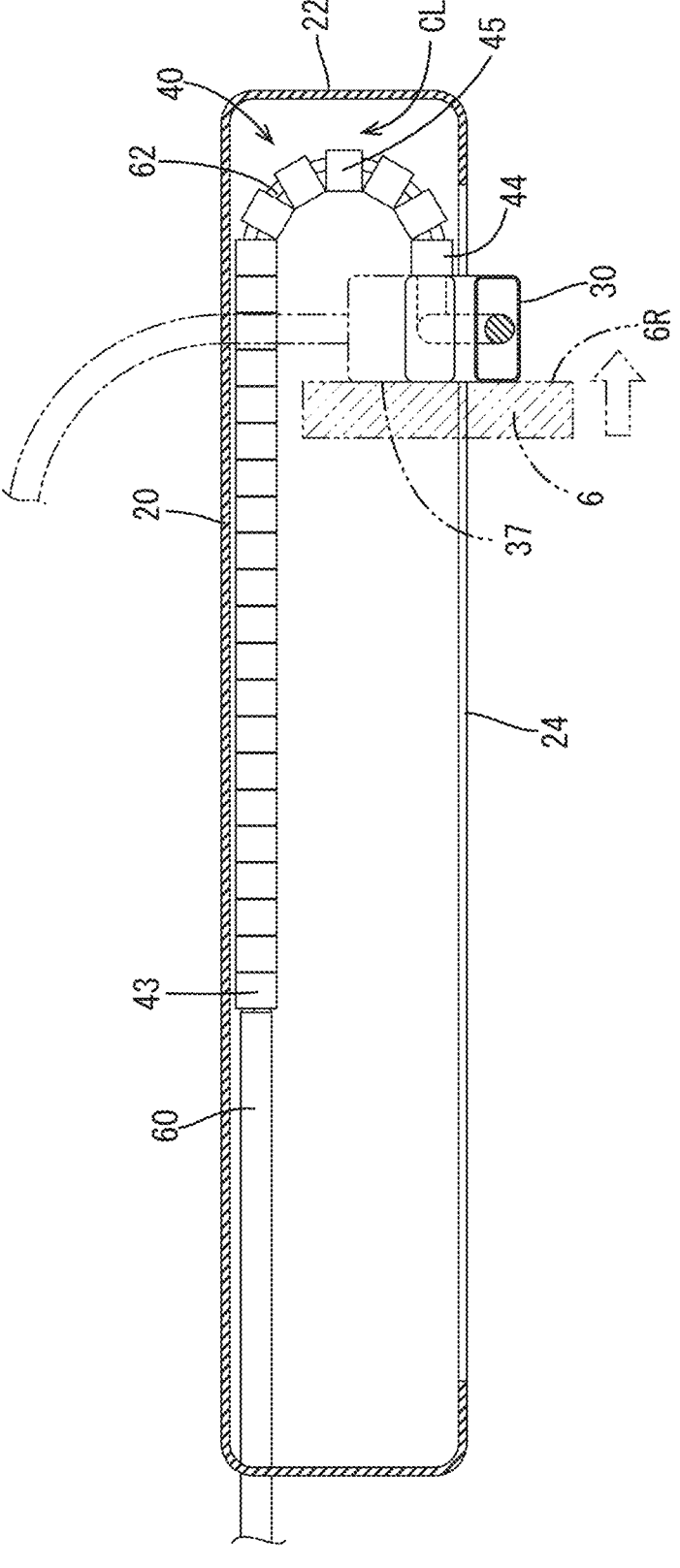
FIG. 17 is a plan view illustrating the protector that is moved by the rear contact member and reaches the rear end position.
Figure 18:
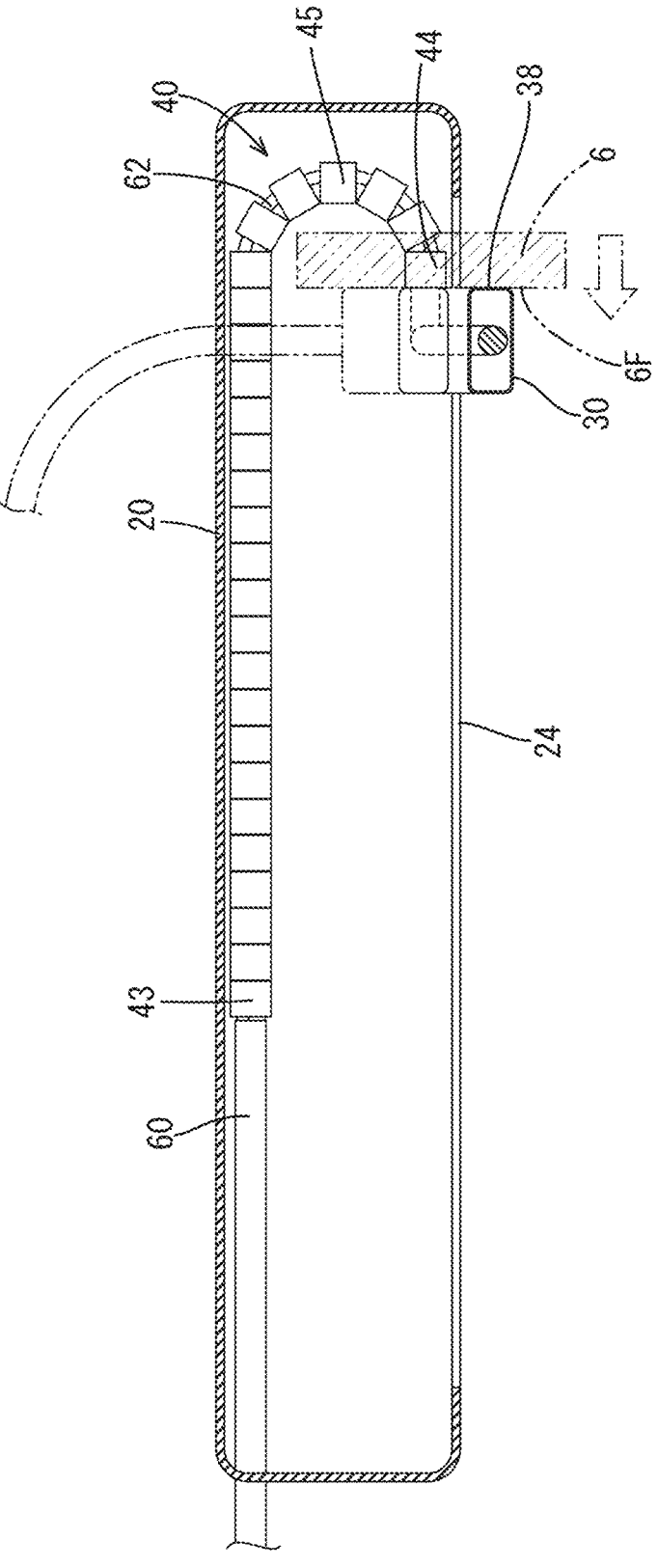
FIG. 18 is a plan view illustrating the protector that is at the rear end position and starts to be moved frontward by the rear contact member.
Figure 19:
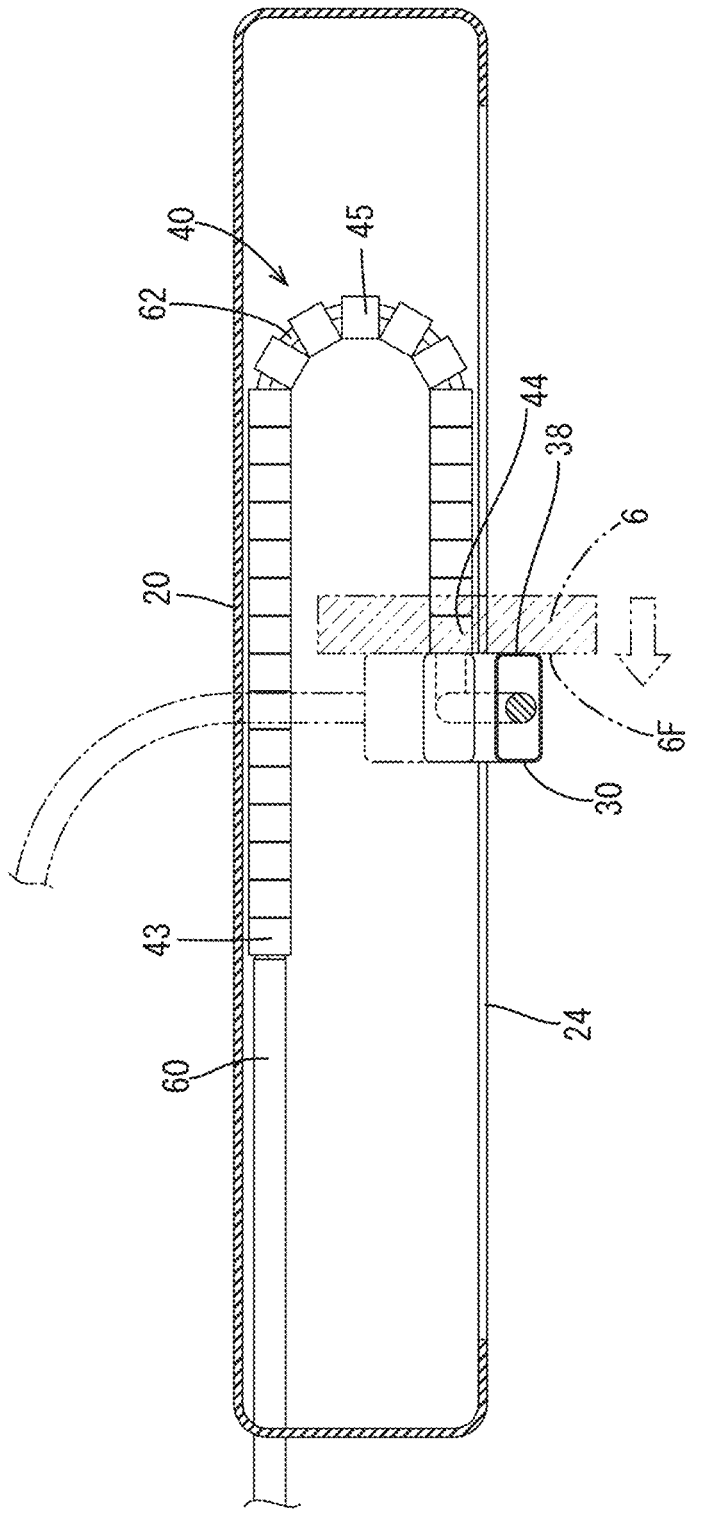
FIG. 19 is a plan view illustrating the protector that is moved by the rear contact member from the rear end position to the front end position.
Figure 20:
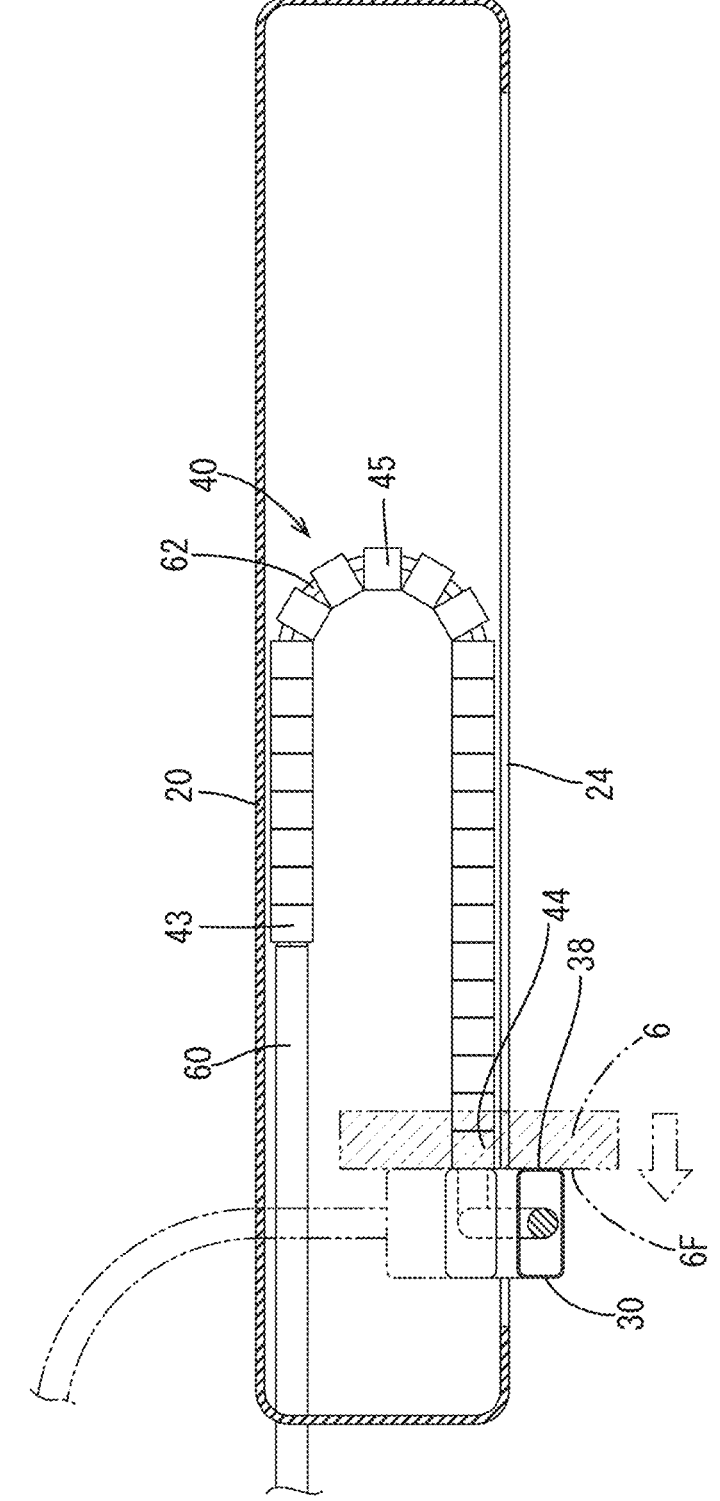
FIG. 20 is a plan view illustrating the protector that is moved by the rear contact member and reaches the front end position.

As illustrated in FIGS. 15 to 17, the second wire portion 62 has a length such that the second wire portion 62 is not tensioned according to the modification of the caterpillar-type cover member 40 when the bent portion 45 of the caterpillar-type cover member 40 moves rearward as the protector 30 moves rearward. As illustrated in FIGS. 18 to 20, the second wire portion 62 has a length such that the second wire portion 62 is not tensioned according to the modification of the caterpillar-type cover member 40 when the bent portion 45 of the caterpillar-type cover member 40 moves frontward as the protector 30 moves frontward. Namely, the second wire portion 62 is the inner extra length portion that is stored in the extra length storing case 20.

Figure 11:
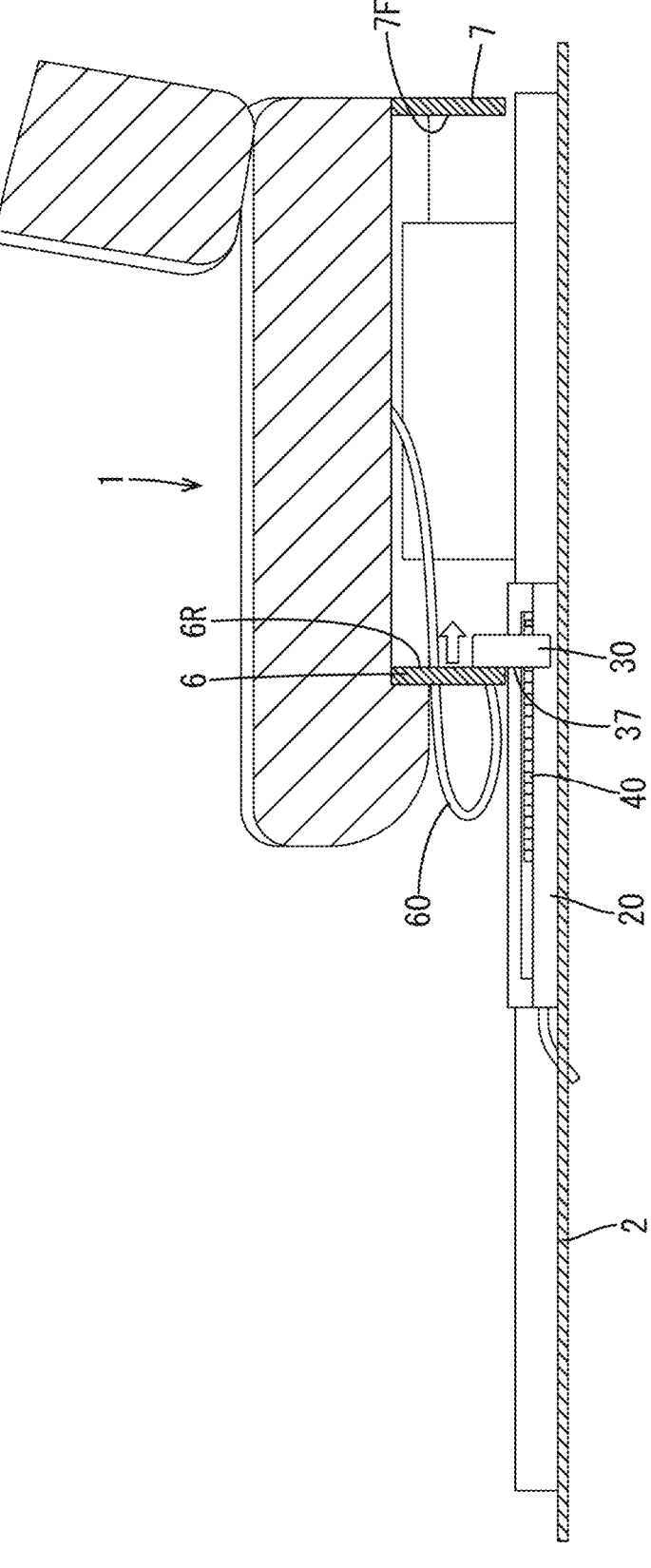
FIG. 11 is a side view illustrating the protector that is moved by the front contact member and reaches the rear end position.
Figure 12:
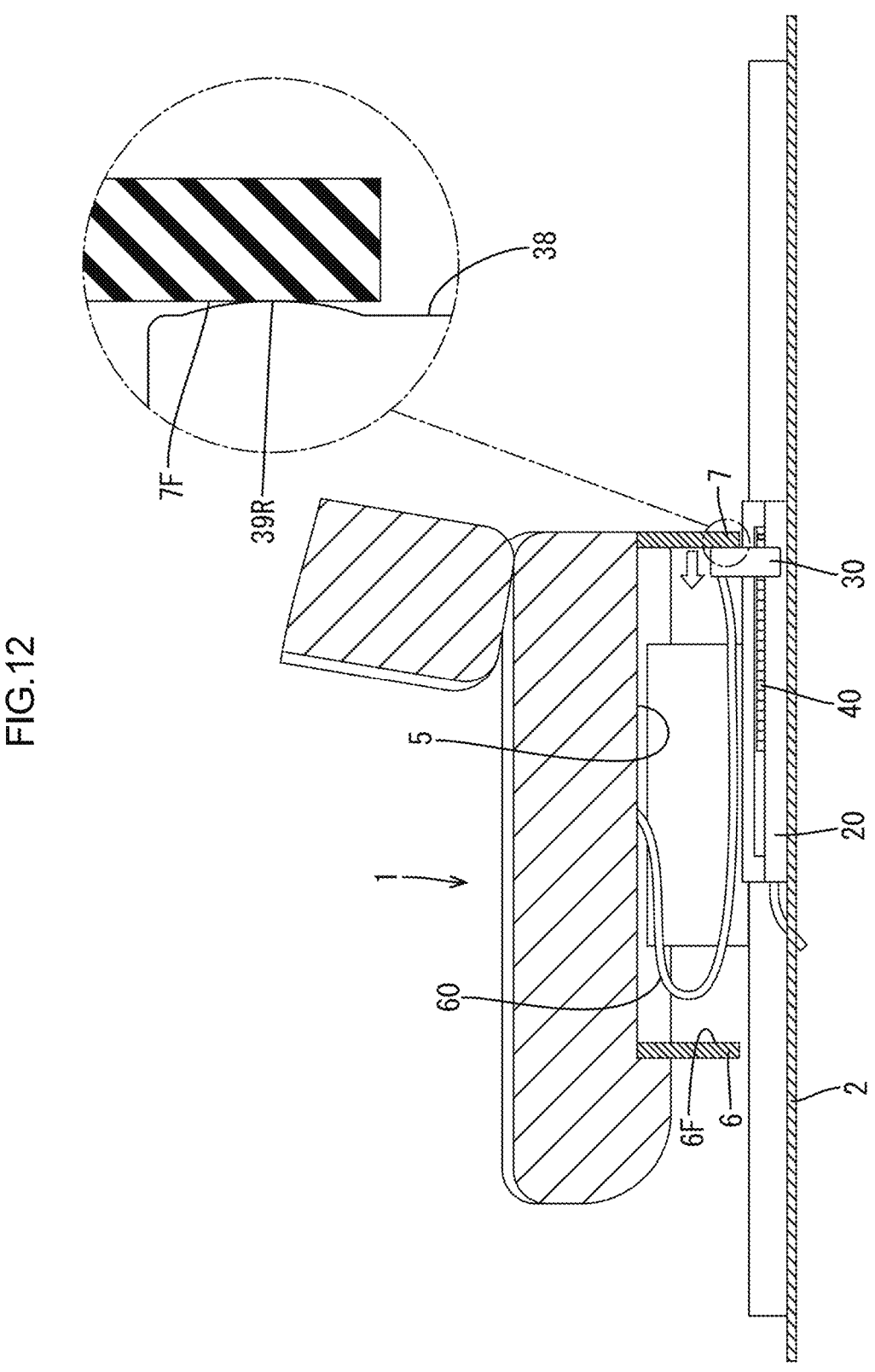
FIG. 12 is a side view illustrating the protector that is at the rear end position starts to be moved frontward by a rear contact member.

The fourth wire portion 64 has a length such that the fourth wire portion 64 is not tensioned rearward when the sliding seat 1 is moved from the rear end position illustrated in FIG. 11 to the middle position illustrated in FIG. 12 with the protector 30 being disposed at the rear end position. The fourth wire portion 64 has a length such that the fourth wire portion 64 is not tensioned rearward when the sliding seat 1 is moved from the middle position illustrated in FIG. 9 to the front end position illustrated in FIG. 14 with the protector 30 being disposed at the front end position. Namely, the fourth wire portion 64 is the outer extra length portion that is disposed outside the extra length storing case 20.

[Configuration of Contact Member]

Figure 9:
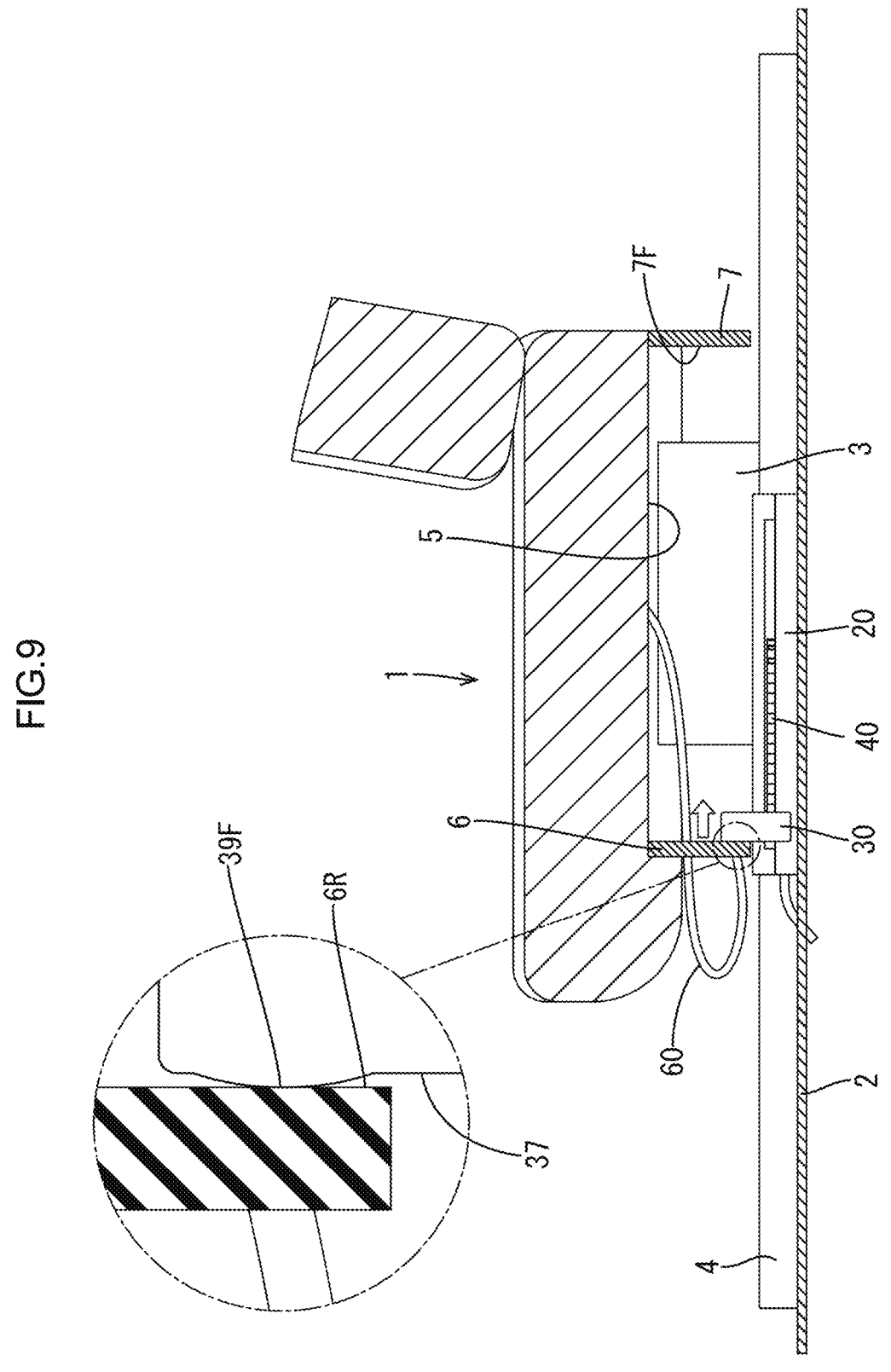
FIG. 9 is a side view illustrating the protector that is at a front end position starts to be moved rearward by a front contact member.

As illustrated in FIG. 9, a pair of front and rear contact members 6, 7 are on a lower surface 5 of the sliding seat 1. The front contact member 6 is on a front edge portion of the lower surface 5 of the sliding seat 1 and the rear contact member 7 is on a rear edge portion of the lower surface 5 of the sliding seat 1.

More specifically, as illustrated in a partial enlarged view of FIG. 9, a rear surface 6R of the front contact member 6 and a front surface 37 of the protector 30 are opposite each other and are defined as a pair of opposing surfaces. The protector 30 includes a front curved surface portion 39F on the front surface 37. The rear surface 6R of the front contact member 6 can be contacted with the front curved surface portion 39F with linear contact or point contact. The front curved surface portion 39F is not illustrated in the drawings other than the partial enlarged view of FIG. 9.

Similarly, as illustrated in a partial enlarged view of FIG. 12, a front surface 7F of the rear contact member 7 and a rear surface 38 of the protector 30 are opposite each other and are defined as a pair of opposing surfaces. The protector 30 includes a rear curved surface portion 39R on the rear surface 38. The front surface 7F of the rear contact member 7 can be contacted with the rear curved surface portion 39R with linear contact or point contact. The rear curved surface portion 39R is not illustrated in the drawings other than the partial enlarged view of FIG. 12.

Figure 10:
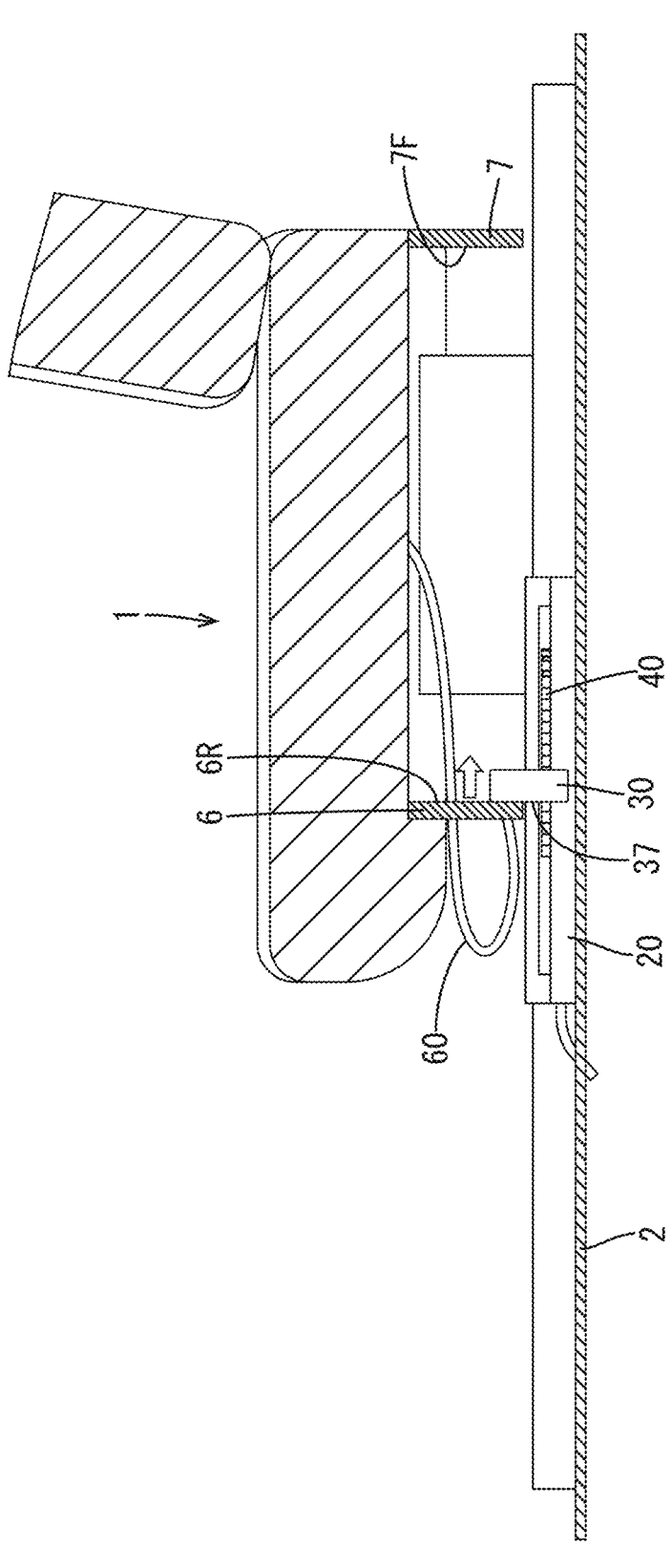
FIG. 10 is a side view illustrating the protector that is moved by the front contact member from the front end position to a rear end position.
Figure 13:
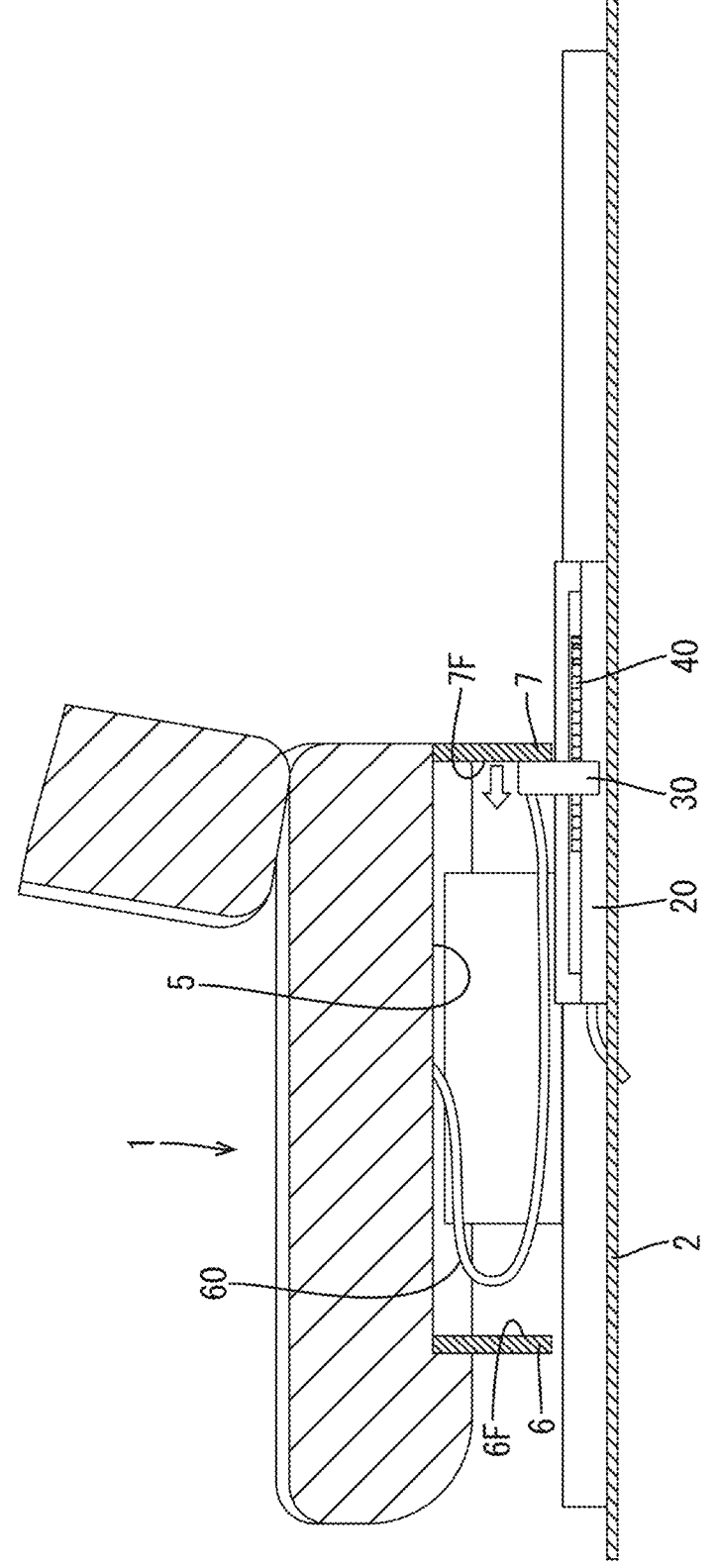
FIG. 13 is a side view illustrating the protector that is moved by the rear contact member from the rear end position to the front end position.
Figure 14:
FIG. 14 is a side view illustrating the protector that is moved by the rear contact member and reaches the front end position.

As illustrated in FIGS. 9 to 11, when the sliding seat 1 is moved rearward, the front contact member 6 is contacted with the front surface 37 of the protector 30 and moves the protector 30 rearward. As illustrated in FIGS. 12 to 14, when the sliding seat 1 is moved frontward, the rear contact member 7 is contacted with the rear surface 38 of the protector 30 and moves the protector 30 frontward. Thus, the protector 30 is not moved in the front-rear direction by being pulled by the fourth wire portion 64 but moved in the front-rear direction by the front contact member 6 or the rear contact member 7. Therefore, the fourth wire portion 64 is less likely to receive tension stress or less likely to be bent suddenly.

[Operations of Wire Harness Routing Device]

Next, operations of the wire harness routing device 10 of the present disclosure will be described. As illustrated in FIG. 15, as the sliding seat 1 starts to move rearward with the protector 30 being at the front end, the front contact member 6 is contacted with the front surface 37 of the protector 30 and the protector 30 starts to be moved rearward. As illustrated in FIG. 16, when the protector 30 reaches the middle position, the bent portion 45 of the caterpillar-type cover member 40 moves rearward and the whole shape of the caterpillar-type cover member 40 changes. The whole shape of the second wire portion 62 also changes according to the change of the whole shape of the caterpillar-type cover member 40. As illustrated in FIG. 17, when the sliding seat 1 reaches the rear end position and the protector 30 reaches the rear end position, the bent portion 45 of the caterpillar-type cover member 40 is positioned near the lower end of the extra length storing case 20 with keeping a clearance CL1 between the rear wall 22R, which is at a rear end portion of the peripheral wall 22, and the bent portion 45.

While the sliding seat 1 moves from the middle position illustrated in FIG. 9 to the rear end position illustrated in FIG. 11, relative positional relation of the sliding seat 1 and the protector 30 does not change. Therefore, the whole shape of the fourth wire portion 64 does not change. This means that the fourth wire portion 64 does not need an extra length when the sliding seat 1 moves from the middle position to the rear end position.

While the sliding seat 1 moves from the rear end position illustrated in FIG. 11 to the middle position illustrated in FIG. 12, the protector 30 stops at the rear end position. This means that the second wire portion 62 does not need an extra length when the sliding seat 1 moves from the rear end position to the middle position.

As illustrated in FIG. 18, when the sliding seat 1 starts to move frontward with the protector 30 being at the rear end position, the rear contact member 7 is contacted with the rear surface 38 of the protector 30 and the protector 30 starts to move frontward. As illustrated in FIG. 19, when the protector 30 reaches the middle position, the bent portion 45 of the caterpillar-type cover member 40 is moved frontward and the whole shape of the caterpillar-type cover member 40 is changed. As the whole shape of the caterpillar-type cover member 40 changes, the whole shape of the second wire portion 62 also changes. As illustrated in FIG. 20, when the protector reaches the front end position, the bent portion 45 of the caterpillar-type cover member 40 is positioned near the middle of the extra length storing case 20 and stops.

While the sliding seat 1 moves from the middle position illustrated in FIG. 12 to the front end position illustrated in FIG. 14, the relative positional relation of the sliding seat 1 and the protector 30 does not change and therefore, the shape of the bent fourth wire portion 64 does not change. This means that the fourth wire portion 64 does not need an extra length when the sliding seat 1 moves from the middle position to the front end position.

The second wire portion 62 needs an extra length only while the protector 30 moves relatively to the extra length storing case 20. Therefore, at least the length of the slide rail 24 is necessary for the extra length for the second wire portion 62. The length of the slide rail 24 corresponds to a distance that the protector 30 moves. Therefore, the second wire portion 62 can be shortened and this can reduce the size of the extra length storing case 20.

The fourth wire portion 64 needs an extra length only while the sliding seat 1 moves relatively to the protector 30. Therefore, at least the length corresponding to the distance between the front contact member 6 and the rear contact member 7 is necessary for the extra length for the fourth wire portion 64. Therefore, the fourth wire portion 64 can be shortened and the fourth wire portion 64 can be routed under the sliding seat 1 even with the clearance CL2 (see FIG. 2) between the lower surface 5 of the sliding seat 1 and the floor 2 being small.

[Operations and Effects of Wire Harness Routing Device]

The wire harness routing device 10 of this embodiment is for routing the wire harness 60 under the sliding seat 1. The wire harness routing device 10 includes the extra length storing case 20 and the protector 30. The extra length storing case 20 is disposed on the floor 2 that is opposite the lower surface 5 of the sliding seat 1. The protector 30 is movable with respect to the extra length storing case 20. The wire harness 60 includes the second wire portion 62 and the fourth wire portion 64. The second wire portion 62 is disposed in the extra length storing case 20 and extends toward the protector 30. The fourth wire portion 64 extends outside the extra length storing case 20 from the protector 30 toward the lower surface 5 of the sliding seat 1. The sliding seat 1 includes a pair of contact members 6, 7 each of which can be contacted with and move the protector 30 according to movement of the sliding seat 1.

When the sliding seat 1 is moved, the fourth wire portion 64, which is linked to the sliding seat 1, moves to absorb the extra length of the wire harness 60. If the extra length cannot be absorbed only by the movement of the fourth wire portion 64, the protector 30 moves such that the second wire portion 62, which is arranged in the extra length storing case 20, is moved and the extra length of the wire harness 60 is absorbed. The extra length storing case 20 can be reduced in size by absorbing the extra length inside and outside the extra length storing case 20. Furthermore, since the protector 30 is moved by the contact of the contact member 6, 7 of the sliding seat 1 and the protector 30, the wire harness 60 is less likely to receive tension stress. Therefore, even with no sufficient space being provided under the sliding seat 1, the extra length storing case 20 can be disposed on the floor 2. This improves appearance.

(2) The protector 30 and the contact member 6, 7 preferably have a pair of opposing surfaces and one opposing surface of the pair of opposing surfaces is preferably included in the protector 30. The one opposing surface of the protector 30 preferably includes the curved surface portion 39F, 39R that is to be contacted with the opposing surface 6R, 7F of the contact member 6, 7 with point contact or linear contact.

When the opposing surface 6R, 7F of the contact member 6, 7 is contacted with the opposing surface of the protector 30, the curved surface portion 39F, 39R, which is on the opposing surface of the protector 30, is contacted with the opposing surface 6R, 7F with point contact or linear contact. Therefore, the contact position of the protector 30 and the contact member 6, 7 is always same.

(3) The extra length storing case 20 preferably includes the peripheral wall 22 that extends from the floor 2 toward the sliding seat 1. The peripheral wall 22 preferably includes a sliding structure with which the protector 30 is slidably mounted on the peripheral wall 22.

With the sliding structure being included within a height range of the peripheral wall 22, the extra length storing case 20 is less likely to be increased in size due to the sliding structure.

(4) The wire harness 60 preferably further includes the third wire portion 63 that is disposed in the protector 30 and connects the second wire portion 62 and the fourth wire portion 64. The third wire portion 63 preferably includes the peripheral wall through portion 65 that extends through the peripheral wall 22.

The wire harness 60 includes the first wire portion 61, the second wire portion 62, the third wire portion 63, and the fourth wire portion 64. In other words, the wire harness 60 extends through the peripheral wall 22, with the peripheral wall through portion 65 of the third wire portion 63 being through the peripheral wall 22, to the outside of the extra length storing case 20 from a lateral side thereof. Then, the wire harness 60 is routed toward the lower surface 5 of the sliding seat 1. Therefore, even with no sufficient space being provided between the extra length storing case 20 and the lower surface 5 of the sliding seat 1, the wire harness 60 can be routed in a small space. If the wire harness 60 extends upward and out of the extra length storing case 20 toward the lower surface 5 of the sliding seat 1, the wire harness 60 may be stepped on with shoes from above and may be broken. With the above configuration, such breakage is less likely to be caused.

OTHER EMBODIMENTS (1) In the above embodiment, the protector 30 includes the curved surface portions 39F, 39R; however, the contact members 6, 7 may include curved surface portions. Neither the protector nor the contact members may include curved surface portions and the protector and the contact members may be configured to be surface-contacted with each other.

(2) In the above embodiment, the protector 30 is movable along the slide rail 24 that is included in the peripheral wall 22 of the extra length storing case 20; however, the bottom wall 21 of the extra length storing case 20 may include a slide rail.

(3) In the above embodiment, the wire harness 60 extends outside the extra length storing case 20 from the lateral side of the extra length storing case 20; however, the wire harness 60 may extend upward from the extra length storing case 20.

EXPLANATION OF SYMBOLS

1: sliding seat
2: floor
3: seat leg
4: seat rail
5: lower surface
6: front contact member
6R: rear surface
7: rear contact member
7F: front surface
10: wire harness routing device
20: extra length storing case
21: bottom wall
22: peripheral wall
22F: front wall
22R: rear wall
22S: side wall
23: top wall
24: slide rail (sliding structure)
24U, 24L: rail
25: slit
26: inlet hole
30: protector
31: inner protector
32: outer protector
33: connection portion
34V: vertical portion
34H: horizontal portion
35: inlet hole
36: outlet hole
37: front surface (opposing surface)
38: rear surface (opposing surface)
39F: front curved portion
39R: rear curved portion
40: caterpillar-type cover member
41: block
42: hinge portion
43: one end
44: another end
45: bent portion
50: corrugated tube
60: wire harness
61: first wire portion
62: second wire portion (inner extra length portion)
63: third wire portion (intermediate connection portion)
64: fourth wire portion (outer extra length portion)
65: peripheral wall through portion
CL1: clearance
CL2: clearance

The invention claimed is:

1. A wire harness routing device with which a wire harness is routed under a sliding seat, the wire harness routing device comprising:

an extra length storing case disposed on a floor that is opposite a lower surface of the sliding seat; and a protector that is movable with respect to the extra length storing case, wherein the wire harness includes an inner extra length portion and an outer extra length portion, the inner extra length portion is disposed in the extra length storing case and extends toward the protector and the outer extra length portion extends outside the extra length storing case from the protector toward the lower surface of the sliding seat, and the sliding seat includes a pair of contact members that come into contact with the protector according to movement of the sliding seat and move the protector.

2. The wire harness routing device according to claim 1, wherein the protector and each of the contact members have a pair of opposing surfaces that are opposite each other, and one of the pair of opposing surfaces includes a curved surface portion that can be contacted with another one of the pair of opposing surfaces with point contact or linear contact.

3. The wire harness routing device according to claim 1, wherein the extra length storing case includes a peripheral wall that extends from the floor toward the sliding seat, and the peripheral wall includes a sliding structure in which the protector is slidably mounted.

4. The wire harness routing device according to claim 3, wherein the wire harness further includes an intermediate connection portion that connects the inner extra length portion and the outer extra length portion and is disposed in the protector, and the intermediate connection portion includes a peripheral wall through portion that extends through the peripheral wall.

5. The wire harness routing device according to claim 2, wherein the extra length storing case includes a peripheral wall that extends from the floor toward the sliding seat, and the peripheral wall includes a sliding structure in which the protector is slidably mounted.

*   *   *   *   *